United States Patent [19]

Hodakowski

[11] 4,116,786

[45] Sep. 26, 1978

[54] RADIATION CURABLE COATING COMPOSITIONS CONTAINING AN ACRYLATE-CAPPED, POLYETHER URETHANE AND A POLYSILOXANE

[75] Inventor: Leonard Edward Hodakowski, Saint Albans, W. Va.

[73] Assignee: Union Carbide Corporation, New York, N.Y.

[21] Appl. No.: 694,157

[22] Filed: Jun. 8, 1976

[51] Int. Cl.$^2$ .................... C08F 2/46; C08F 30/08
[52] U.S. Cl. .................... 204/159.13; 204/159.16; 260/29.1 SB; 260/827; 260/859 R; 427/44; 427/54; 428/425; 428/429; 428/461
[58] Field of Search ............ 204/159.13, 159.15, 204/159.16; 427/44, 54; 260/29.1 SB, 827

[56] References Cited

U.S. PATENT DOCUMENTS

| | | | |
|---|---|---|---|
| 3,297,745 | 1/1967 | Fekete et al. | 260/471 |
| 3,694,415 | 9/1972 | Honda et al. | 260/77.5 CR |
| 3,700,643 | 10/1972 | Smith et al. | 204/159.14 X |
| 3,782,961 | 1/1974 | Takahashi et al. | 96/115 R |
| 3,840,448 | 10/1974 | Osborn et al. | 204/159.14 X |
| 3,954,584 | 5/1976 | Miyata et al. | 204/159.23 |

*Primary Examiner*—Richard B. Turer
*Attorney, Agent, or Firm*—Peter R. Shearer

[57] ABSTRACT

Radiation curable coating compositions that contain an acrylate-capped polyether urethane, a low molecular weight polyfunctional acrylate, a monofunctional acrylate and, optionally, a photo-initiator are described. When cured, the coating compositions are sufficiently hard and flexible to serve as an overprint coating on sheet metal which is to undergo metal forming operations.

8 Claims, No Drawings

RADIATION CURABLE COATING COMPOSITIONS CONTAINING AN ACRYLATE-CAPPED, POLYETHER URETHANE AND A POLYSILOXANE

BACKGROUND OF THE INVENTION

Efforts to reduce energy consumption and toxic emissions in the application and curing of coatings have led coatings producers to develop so called "100 percent solids" radiation curable coatings. These coatings comprise mixtures of reactive compounds which can be applied to substrates as liquids at room temperature and which polymerize upon exposure to radiation to produce solid coatings. Since all the coating substituents are reactive, the need to apply heat to evaporate solvents is eliminated. Numerous coatings of this type have been disclosed in recent years. However, it is always desirable that new compositions be developed which satisfy the physical requirements of particular coating applications.

In some instances, it is desired to apply a 100 percent solids radiation curable coating as a protective layer over printing or a design on a sheet of metal which will subsequently undergo a metal forming operation. An example of such an application is a clear coating applied as a protective layer over the printing or design on a sheet of metal which is subsequently formed into a bottle cap. To be useful in such an application the cured coating must be hard enough to afford protection for the printing or design, yet flexible enough to bend during the metal forming operation without cracking or crazing. Moreover, it is desirable that the viscosity of the uncured coating composition be such that it can be applied to the substrate by conventional film application methods such as reverse roll coating or direct roll coating.

Frequently, in handling the coated metal sheets or coated formed articles on production lines, it is desired to slide a coated sheet or formed article across a metal surface or a similarly coated surface. For example, in stacking and unstacking operations one may desire to slide the coated or uncoated side of one coated sheet of metal across the coated side of another sheet of metal. In such instances, it is necessary that the coated surface have a sufficient degree of surface lubricity to prevent sticking or damage to the coating due to abrasion. If the coating does not have sufficient inherent surface lubricity, one can impart the desired lubricity by applying to the coating surface a film of lubricant, such as a lubricating oil. However, this is inconvenient since it necessitates additional processing steps and machinery for the application of the lubricant and for its removal when it is no longer needed. Further, lubricating oils can cause certain types of radiation curable coatings to become hazy in appearance.

It is an object of the present invention to provide radiation curable coating compositions which are sufficiently hard and flexible in the cured state to be used as a protective coating over printing or designs on a sheet of metal which is to undergo metal forming operations. It is a further object of this invention to provide radiation curable compositions, as aforesaid, which have sufficient inherent surface lubricity in the cured state to allow the coated surface to slide easily across metal surfaces or similarly coated surfaces during processing of the coated metal. Other objects and advantages of this invention will be apparent to those skilled in the art from the disclosure herein.

SUMMARY OF THE INVENTION

The radiation curable coating compositions of this invention contain an acrylate-capped polyether urethane, a low molecular weight polyfunctional acrylate, a monofunctional acrylate and, optionally, other components such as photoinitiators. In one embodiment of the invention, the radiation curable coating composition contains a small amount by weight of a polyether-functional polysiloxane which imparts inherent surface lubricity to the cured coating.

DESCRIPTION OF THE INVENTION

The acrylate-capped polyether urethanes employed in the radiation curable coating compositions of this invention are defined by the formula:

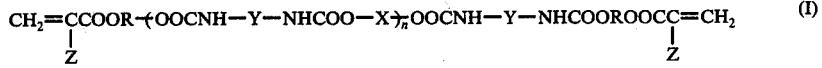

wherein Z is hydrogen or methyl; R is $-C_mH_{2m}$; Y is the residue remaining after the reaction of an organic diisocyanate, as more fully described hereinafter; X is the residue remaining after the reaction of a polyether glycol, as more fully described hereinafter; $m$ has a value from 2 to 5; and $n$ has a value of from 1 to about 5, preferably from 1 to 3.

The residue X is produced from a polyether glycol. The polyether glycol employed can be polyoxypropylene glycol, polyoxyethylene glycol or poly(propylene oxide/ethylene oxide) glycol copolymer. These polyether glycols are well known to those skilled in the art. They may be represented by the general formulas:

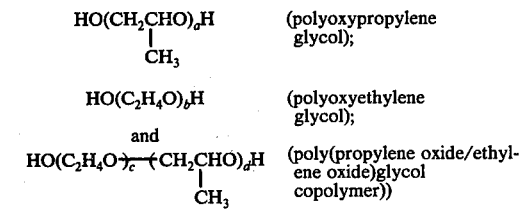

and the copolymer can be a random or block copolymer. The polyether glycols which are useful in producing the acrylate-capped polyether urethanes used in this invention have values of $a$, $b$, $c$ and $d$ such that the molecular weights of the polyether glycols are from about 300 to about 4,000. From the standpoint of producing a cured coating which is both hard and flexible, I prefer to employ, as the polyether glycol, polyoxypropylene glycol having a molecular weight of from about 1,000 to about 2,500. Those skilled in the art will recognize that the polyether glycols described above are derivatives of propylene oxide and ethylene oxide and will know the suitable methods of producing them such as, for example, the condensation polymerization of ethylene oxide and/or propylene oxide and water. The residue X is produced by the reaction of the aforesaid polyether glycol with an organic diisocyanate. The reaction, which occurs at the hydroxyl groups of the polyether glycol, is well known and produces the urethane groups in formula I

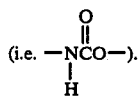

The residue X is that portion of the polyether glycol exclusive of the hydroxyl hydrogen and oxygen atoms which participate in the urethane producing reaction. Thus, when the polyether glycol is a polyoxypropylene glycol the residue has the formula

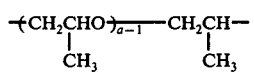

The residue Y is produced from any of the well known organic diisocyanates which have utility in urethane producing reactions. Many such compounds are known to those skilled in the art and illustrative thereof one can mention 2,4-tolylene diisocyanate, 2,6-tolylene diisocyanate, isophorone diisocyanate, 4,4'-diphenylmethane diisocyanate, di(2-isocyanatoethyl)-bicyclo [2.2.1] hept-5-ene-2,3-dicarboxylate, 3,5,5-triethyl-1-isocyanato-3-isocyanatomethylcyclohexane, 1,6-hexamethylene diisocyanate, dianisidine diisocyanate, tolidine diisocyanate, m- and p-xylylene diisocyanate, cyclohexane-1,4-diisocyanate, dicyclohexyl-4,4'-methane diisocyanate, tetramethylene diisocyanate, cyclopentylene-1,3-diisocyanate and the like. The foregoing list is illustrative only and is not intended to exclude any other useful organic diisocyanates known to those skilled in the art. The residue Y is that portion of the organic diisocyanate exclusive of the terminal isocyanato groups and is produced by reacting the organic diisocyanate with polyether glycol and a hydroxyalkyl acrylate which has from 2 to 5 carbon atoms in the alkyl segment, in proportions such that the total number of hydroxyl groups present is approximately equal to the number of isocyanato groups. Thus, for example, when the organic diisocyanate employed to produce the acrylate-capped polyether urethane is 2,4-tolylene diisocyanate the residue Y is

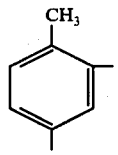

and when the organic diisocyanate is 1,6-hexamethylene diisocyanate the residue Y is $-C_6H_{12}$.

It will be obvious to one skilled in the art from the foregoing discussion that the acrylate-capped polyether urethane represented by formula I is produced by reacting 2 moles of hydroxyalkylacrylate with $n$ moles of polyether glycol and $n+1$ moles of organic diisocyanate. This polyurethane producing reaction and conditions under which it proceeds will be readily understood by one skilled in the art without any further discussion herein. Moreover, certain compounds of the class described in formula I and methods for their preparation are disclosed in U.S. Pat. No. 3,297,745, the teachings of which are incorporated herein by reference.

The acrylate-capped polyether urethane is present in the radiation curable coating compositions of this invention at a concentration of from about 5 weight percent to 70 weight percent of said composition and preferably from 25 weight percent to 60 weight percent thereof.

The second major component of the radiation curable coating compositions of this invention is the low molecular weight polyfunctional acrylate. This second component has a molecular weight of from about 170 to 1,200, preferably from about 210 to 550 and contains from 2 to 3 acrylyl groups. The radiation curable coating composition can contain from 80 to 5 weight percent of this component, preferably from 40 to 10 weight percent thereof.

The low molecular weight polyfunctional acrylates can be represented by the formula

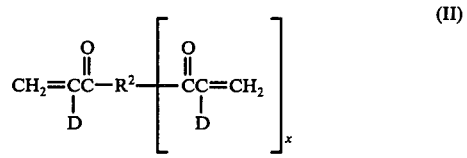

wherein D is hydrogen or methyl, $x$ is 1 or 2, $R^2$ is chosen from the group consisting of

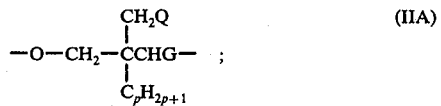

$-OC_rH_{2r}O-$                   (IIC)

and

wherein Q is hydrogen or $-O-$, G is $-O-$ or

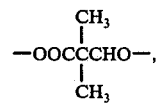

M is hydrogen or alkyl of 1 to 2 carbon atoms, $p$ has a value of 1 to 3, $q$ has a value of 2 to 6 and is preferably 2 to 4, $r$ has a value of 2 to 15 and is preferably 2 to 10, $r'$ has a value of 2 to 4 and R' is the residue of an organic diisocyanate after its reaction with a hydroxyalkyl acrylate. Illustrative of the compounds represented by formula II when $R^2$ is represented by IIA, IIB, or IIC one can mention neopentyl glycol diacrylate, 2,2-dimethyl-3-hydroxypropyl-2,2-dimethyl-3-hydroxypropionate diacrylate, ethylene glycol diacrylate, diethylene glycol diacrylate, triethylene glycol diacrylate, trimethylolpropane triacrylate, 1,6-hexanediol diacrylate and the like. When $R^2$ is represented by IID, the compounds represented by formula II are adducts of 1 mole of an organic diisocyanate and 2 moles of hydroxyalkyl acrylate or a hydroxyalkyl methacrylate such as, for example, the adduct of 1 mole of isophorone diisocyanate and 2 moles of hydroxyethyl acrylate, the adduct of 1 mole of tolylene diisocyanate and 2 moles of hydroxyethyl acrylate and the like. Any of the known and previously mentioned organic diisocyanates which can be suitably employed in producing the acrylate-capped polyether urethane can likewise be employed to produce the compounds represented by formula II when $R^2$ is IID. All the compounds represented by formula II can be produced by known means.

The third major component of the radiation curable compositions of this invention is a low molecular weight monofunctional acrylate. The monofunctional acrylates serve primarily as diluents in the uncured compositions. This component can be any of the monofunctional acrylate compounds having molecular weights from about 100 to 400, and preferably from 100 to 250, which are known to those skilled in the art as having utility in radiation curable compositions. Illustrative of such compounds one can mention allyl acrylate, n-amyl acrylate, benzyl acrylate, hydroxyethyl acrylate, hydroxypropyl acrylate, cyclohexyl acrylate, cyclopentyl acrylate, 2-ethoxyethyl acrylate, diethylaminoethyl acrylate, isopropyl acrylate, n-lauryl acrylate, nonyl acrylate, n-octadecyl acrylate, n-octyl acrylate, 2-phenoxyethyl acrylate, 2-ethylhexyl acrylate, N-methyl (2-carbamoyloxy)ethyl acrylate and the like, the compounds obtained when methacrylyl groups are substituted for the acrylyl groups of the foregoing compounds, or mixtures of these. The foregoing list is meant to be illustrative only and is not meant to exclude any monoacrylates known to those skilled in the art as having utility in the production of radiation curable compositions. The low molecular weight monofunctional acrylates can be present in the radiation curable coating compositions of this invention at a concentration of from about 0.5 to 80 weight percent, and preferably from 5 to 60 weight percent.

In one embodiment of this invention, radiation curable coating compositions having inherent surface lubricity are produced by having present therein, in addition to the other substituents disclosed herein, a polyether-functional polysiloxane at a concentration of from about 0.01 to 2 weight percent based on the weight of the radiation curable coating composition. While higher concentrations of polyether-functional polysiloxane may be employed, no advantage is gained in so doing. The polyether-functional polysiloxane is chosen from the group represented by the formulas

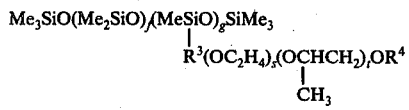 (III)

and

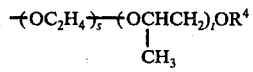 (IV)

wherein at least 50% of the M' units are

and the remaining M' units are lower alkoxy groups; $R^3$ is alkylene having from 1 to 4 carbon atoms; $R^4$ is alkyl having from 1 to 4 carbon atoms; Me is methyl; $f$ has a value from 10 to 100; $g$ has a value from 1 to 20; and $s$ and $t$ are numbers such that the average molecular weight of the polyoxyalkylene units,

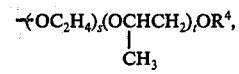

is from about 1,200 to 3,000 and from 20 to 80 weight percent of the oxyalkylene units are oxyethylene units.

The compounds represented by forumulas III and IV above are known to those skilled in the art, as are methods of preparing them. The compounds represented by formula III can be prepared, among other methods, by reacting a hydrosiloxane of the formula

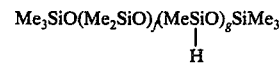

with an ethylene oxide/propylene oxide copolymer that is end-blocked at one end with alkenyl of 1 to 4 carbon atoms and at the other end with alkyl of 1 to 4 carbon atoms, in the presence of catalysts such as platinum, chloroplatinic acid or organic peroxides. Furthermore, compounds of the type described by formula III and methods of their preparation are disclosed in U.S. Pat. No. 2,846,458 and U.S. Pat. No. 27,541, the teachings of which are incorporated herein by reference.

Compounds represented by formula IV can be prepared, among other methods, by reacting an alkoxy-terminated polysiloxane of the formula $MeSi[(OSiMe_2)_fOR'']_3$, wherein R'' is lower alkyl, with an ethylene oxide/propylene oxide copolymer that is end-blocked at one end by a hydroxyl group and at the other end by alkyl of 1 to 4 carbon atoms. The exchange reaction results in the removal of the alkoxy group OR'' as the corresponding alkanol, R''OH, and the production of the compounds of formula IV. Furthermore, compounds of the type described by formula IV and methods of their preparation are disclosed in U.S. Pat. No. 2,834,748, the teachings of which are incorporated herein by reference.

The polyether-functional polysiloxanes which impart inherent surface lubricity to the radiation curable coating compositions of this invention may, if desired, be added to said compositions in the form of a solution in any compatible propylene oxide/ethylene oxide copolymer having a viscosity of up to about 2,000 Saybolt universal seconds and the propylene oxide/ethylene oxide copolymer can be end-blocked with lower alkoxy or hydroxyl groups. There can be up to 50 weight percent of the propylene oxide/ethylene oxide copolymer present in the solution.

The coating compositions of this invention can be cured by ionizing or non-ionizing radiation means including, but not limited to, ultraviolet and electron beam radiation. These curing methods and the equipment that can be used fro them are well known to those skilled in the art. When the coating composition is to be cured by non-ionizing radiation, the presence of a photoinitiator therein is desirable. Any of the known photoinitiators can be used. Illustrative of suitable photoinitiators one can mention 2,2-diethyoxyacetophenone, 2- or 3- or 4-bromoacetophenone, 3- or 4-allylacetophenone, 2-acetonaphthone, benzaldehyde, benzoin, the allyl benzoin ethers, benzopheneone, benzoquinone, 1-chloroanthraquinone, p-diacetylbenzene, 9,10-dibromoanthracene, 9,10-dichloroanthracene, 4,4-dichlorobenzophenone, 1,3-diphenyl-2-propanone, 1,3-diphenylacetone, 4-methoxybenzophenone, 3-chloro-8- nonylxanthone, 3-iodo-7-methoxyxanthone, benzaldehyde, carbazole, 4-chloro-4'-benzylbenzophenone, fluorene, fluorenone, 1,4-naphthylphenylketone, 2,3-pentanedione, 2,2-di-sec-butoxy acetophenone, dimethoxyphenyl acetophenone, propiophenone, chlorothioxanthone, xanthone and the like, or any mixtures of these. The foregoing list is meant to be illustrative only and is not meant to exclude any suitable photoinitiators known to those skilled in the art. Those skilled in the art will know the concentrations at which photoiniators are effectively employed and generally the concentration will not exceed 15 weight percent of the radiation curable coating composition.

Those skilled in the art of photochemistry are fully aware that photoactivators can be used in combination with the aforementioned photoiniators and that synergistic effects are sometimes achieved when such combinations are used. Photoactivators are well known in the art and require no further description for them to know what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethylenimine, piperidine, N-methylpiperazine, 2,2-dimethyl-1-1,3-bis(3-N-morpholinyl) propionyloxy)) propane, and the like, or any combination of these. The radiation curable coating compositions can also contain colorants, fillers, wetting agents, flatting agents and other additives typically present in coating compositions. These are well known and require no further elaboration herein. Also known are the concentrations at which they are employed. While it is preferred that the radiation curable coating compositions of this invention be free of conventional solvents, there can be present in small amounts, preferably less than 5 weight percent, a conventional solvent, if desired.

The concentrations of the individual components which make up the compositions of this invention can be varied at the will of the practitioner within the limits set forth above, provided that the total concentration of acrylate-capped polyether urethane, low molecular weight polyfunctional acrylate and monofunctional acrylate is at least 85 weight percent, and preferably at least 95 weight percent, of the radiation curable coating composition. Generally, when the concentration of the low molecular weight polyfunctional acrylate is increased, one obtains a composition which will produce a cured coating having increased hardness and reduced flexibility due to relatively high crosslink density. When the concentration of low molecular weight monofunctional acrylate is increased, one obtains a omposition which is less viscous in the uncured state.

The foregoing components are combined in any manner suitable for achieving a uniform composition. When the components have been mixed, they can be applied to a substrate by any means suitable for the application of coatings, such as, for example, reverse roll coating, direct roll coating, gravure, curtain coating, doctor knife, spraying or brushing.

While the radiation curable coating compositions of this invention are particularly well suited to forming coatings for metal sheet which is to undergo metal forming operations, they can also be used to form coatings on a variety of other substrates including, but not limited to, glass, wood, panels of thermoplastic or thermoset polymers, asbestos panels, composition boards and the like. The compositions can be applied over a conventional dry printing ink or design and cured to form a protective overprint or they can be applied directly over any of the known radiation curable inks prior to curing the ink and the radiation curable ink and the coating composition simultaneously cured by exposure to radiation.

In the following examples, reverse impact strength was determined by dropping a five pound rod having a rounded tip onto the uncoated side of the substrate and recording the distance of drop required to crack the coating surface; the value is then reported in inch-pounds. Acetone resistance, which is a measure of through cure of the coating, was determined by applying a 0.5 inch square cotton cloth pad saturated with acetone on the surface of the cured coating and determining the time in seconds required for the acetone to penetrate through the coating film and lift the coating from the substrate. Tensile strength and elongation were determined according to ASTM D-638. Sward hardness was determined by the standard procedure using a Gardner Automatic Sward Hardness Tester, with measurements being made in the direction across the substrate web (width) and along the substrate web (length). Gloss was measured on a Gardner Glossmeter and is reported on a scale in which a value of 100 equals a mirror finish and a value of 0 equals a matte finish. Thermal stability was determined by placing the uncured coating compositions in a forced air oven at 73° C. and measuring the time to gelation. To determine pencil hardness, the "leads" of pencils containing "lead" of different hardnesses were ground flat, perpendicular to the axis and the coating was scratched with various "leads." The hardest pencil (e.g., 2H, 4H) which did not scratch through the coating was designated as the pencil hardness.

The following designations and abbreviations are used in the examples.

| | |
|---|---|
| Polyether urethane A: | An acrylate-capped polyether urethane produced by reacting polyoxypropylene glycol having an average molecular weight of about 2,000, isophorone diisocyanate and hydroxyethyl acrylate in a respective mole ratio of 1:2:2 and containing about 5 weight percent unreacted hydroxyethyl acrylate. |
| Polyether urethane B: | An acrylate-capped polyether urethane produced by reacting polyoxypropylene glycol having an average molecular weight of about 2,000, dicyclohexyl-4,4'-methane diisocyanate and hydroxyethyl acrylate in a respective mole ratio of 1:2:2 and containing about 5 weight percent unreacted hydroxyethyl acrylate. |
| Polyether urethane C: | An acrylate-capped polyether urethane produced by reacting polyoxypropylene glycol having an average molecular weight of about 1,000, isophorone diisocyanate and hydroxethyl acrylate in a respective mole ratio of 1:2:2 and containing about 5 weight percent unreacted hydroxyethyl acrylate. |
| NPGDA: | Neopentyl glycol diacrylate |
| TEGDA: | Triethylene glycol diacrylate |
| Esterdiol diacrylate: | $CH_2=CHCOOCH_2C(CH_3)_2CH_2OCOC(CH_3)_2CH_2OOCH=CH_2$ |
| MCEA: | N-methyl (2-carbamoyloxy) ethyl acrylate |
| IPDI/2 HEA: | An adduct of 1 mole of isophorone |

-continued

HEA: 2-hydroxyethyl acrylate
DEAP: Diethoxyacetophenone
Slip additive A:

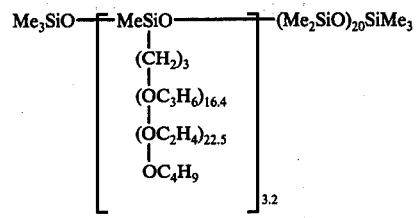

Slip additive B: A composition containing about 55 weight percent of the terpolymer represented by the formula

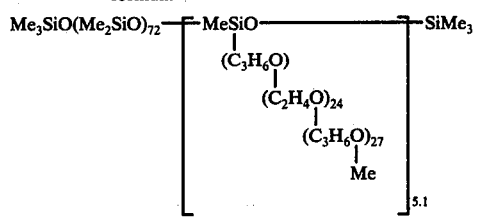

and about 45 weight percent of a butanol-started random copolymer of propylene oxide and ethylene oxide having an average molecular weight of 1500.

Slip additive C:

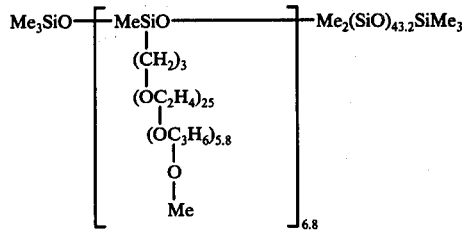

Slip additive D:
MeSi[(OSiMe$_2$)$_{6.4}$M']$_3$
wherein 80% of the M' units are
—OC$_2$H$_4$)$_{22.3}$(OC$_3$H$_6$)$_{16.4}$OC$_4$H$_9$ and 20% of the M' units are —OC$_2$H$_5$.

EXAMPLE 1

A series of six radiation curable coating compositions were prepared by mixing to a uniform consistency the components listed below.

| Component | Weight Per Cent | | | | | |
|---|---|---|---|---|---|---|
| | 1 | 2 | 3 | 4 | 5 | 6 |
| Polyether urethane A | 31.5 | 38.5 | 42.5 | — | — | — |
| Polyether urethane C | — | — | — | 31.5 | 38.5 | 42.5 |
| IPDI/2 HEA | 13.5 | 16.5 | 22.5 | 13.5 | 16.5 | 22.5 |
| MCEA | 53.8 | 43.8 | 33.8 | 53.8 | 43.8 | 33.8 |
| DEAP | 0.9 | 0.9 | 0.9 | 0.9 | 0.9 | 0.9 |
| Slip additive A | 0.3 | 0.3 | 0.3 | 0.3 | 0.3 | 0.3 |

Each of the coating compositions was applied to glass panels using a No. 3 wire wound rod and cured to a solid state by exposure in a nitrogen atmosphere to medium pressure mercury arc lamps delivering a flux of 500 watts per square foot for 1 second. The cured coatings, which were about 2 mils thick, were peeled from the glass panels and subjected to tensile testing (ASTM D-638). Tensile strength and elongation of the cured coatings appear below. Elongation at break is directly related to coating flexibility. It can be seen that, within each group of coatings using a particular polyurethane acrylate, increasing the concentration of IPDI/2 HEA reduced the elongation and hence, the flexibility of the coating.

| | 1 | 2 | 3 | 4 | 5 | 6 |
|---|---|---|---|---|---|---|
| Tensile strength, psi | 1,280 | 1,864 | 1,931 | 1,611 | 2,057 | 2,379 |
| Elongation, % | 94 | 87 | 68 | 88 | 71 | 57 |

EXAMPLE 2

A series of four radiation curable coating compositions were prepared by mixing to a uniform consistency the components listed below.

| Component | Weight Per Cent | | | |
|---|---|---|---|---|
| | 1 | 2 | 3 | 4 |
| Polyether urethane A | 35.0 | 36.9 | — | 19.8 |
| Polyether urethane B | — | — | 29.8 | — |
| NPGDA | 63.9 | 60.3 | 67.8 | — |
| Esterdiol diacrylate | — | — | — | 79.2 |
| HEA* | — | 1.8 | 1.6 | — |
| DEAP | 0.9 | 0.8 | 0.8 | 0.8 |
| Slip additive A | 0.2 | — | 0.2 | 0.2 |
| Slip additive B | — | 0.2 | — | — |

*Not including the unreacted HEA present in the polyether urethane.

The Brookfield RVT viscosity of each radiation curable coating composition was measured using a No. 3 spindle. The radiation curable coating compositions were then applied to Bonderite No. 37 steel panels using a No. 3 wire wound rod. Compositions 1 to 3 were cured by exposure in a nitrogen atmosphere to medium pressure mercury arc lamps delivering a flux of 500 watts per square foot for 1 second. Composition 4 was cured by a 1 second exposure in a nitrogen atmosphere to light of substantially 2537 Angstrom units wavelength at a flux of 35 watts per square foot by the process described in U.S. Pat. No. 3,840,448, followed by a 0.88 second exposure in air to medium pressure mercury arc lamps delivering a flux of 500 watts per square foot. Reverse impact strength of the cured coatings was measured. Brookfield viscosities of the uncured samples and reverse impact strengths of the cured coatings appear below

| | 1 | 2 | 3 | 4 |
|---|---|---|---|---|
| Viscosity, cps | 110 | 135 | 138 | 134 |
| Reverse impact, in.-lb. | 40 | 75 | 25 | — |

Three portions of composition 4 were applied to Bonderite No. 37 steel panels using a No. 3 wire wound rod, a No. 5 wire wound rod and a No. 10 wire wound rod. Each of the applied coating compositions on the substrates was cured in a manner similar to that used to cure composition 4 above. The 60° gloss value of each of the cured coatings on the substrates was measured and is reported below.

| 60° Gloss | | |
|---|---|---|
| #3 w.w.r.* | #5 w.w.r. | #10 w.w.r. |
| 84 | 89 | 91 |

*w.w.r. = wire wound rod

Radiation curable coating compositions 2 and 3 were tested for Gardner color, thermal stability and specific gravity (at 23° C.). The cured coatings on Bonderite No. 37 steel which were produced from compositions 2 and 3 above were tested for Sward hardness, gloss, pencil hardness and acetone resistance and the results are reported below. Portions of radiation curable coating compositions 2 and 3 were applied to a glass substrate using a No. 3 wire wound rod and cured in a manner similar to that used to cure compositions 2 and 3 on the steel substrate. The cured coatings, which were 2 mils thick, were peeled from the glass substrate and tested for tensile strength and elongation. The results are reported below.

|  | Coating composition | |
|---|---|---|
|  | 2 | 3 |
| Gardner color | 1 | 1 |
| Specific gravity (at 23° C) | 1.041 | 1.041 |
| Thermal stability, days | 45 | 45 |
| Sward hardness |  |  |
| length | 34 | 42 |
| width | 40 | 42 |
| 60° gloss | 87 | 83 |
| 20° gloss | 49 | 41 |
| Pencil hardness | 7H | 7H |
| Acetone resistance sec. | 300 | 300 |
| Tensile strength, p.s.i | 3320 | 1266 |
| Elongation, % | 7 | 3.2 |

This example illustrates the preparation of radiation curable compositions of this invention having particularly good hardness due to high crosslink density. While the flexibility of the cured compositions of this example is substantially lower than that of the cured compositions of Example 1, as indicated by elongation, the compositions of this example have utility as metal overprint coatings in end uses where high hardness is required and forming operations subsequent to coating do not impart unusually sharp bends such as undercuts to the coated substrate.

EXAMPLE 3

Three radiation curable coating compositions were prepared by mixing 35 weight percent polyether urethane A, 63.9 weight percent neopentyl glycol diacrylate, 0.6 weight percent diethoxyacetophenone and 2 weight percent of a polyether-functional polysiloxane. The polyether-functional polysiloxane employed in the three radiation curable coatings were slip additives B, D and E respectively. Each of the radiation curable coating compositions was applied to a 3-in. by 9-in. Bonderite No. 37 steel panel using a No. 3 wire wound rod. The coating compositions on the panels were cured in a manner similar to that used to cure compositions 1 to 3 of Example 2. It was observed that each of the compositions of this example cured to a smooth, uniform coating. The coated steel panels were then inclined at an angle of about 45° with the coated side facing up. A coated aluminum bottle cap was placed at the top of each inclined coated panel. On each of the coated panels the bottle cap slid to the bottom of the incline without sticking, indicating that the radiation cured coating had inherent surface lubricity. The results obtained by incorporating the polyether-functional polysiloxanes of this invention into the coating compositions were somewhat unexpected, since a series of 18 coating compositions, produced and tested in a similar manner, which incorporated various polysiloxanes which were not within the scope of this invention either formed cured coatings which caused the bottle cap to stick on the inclined coated panel or formed non-uniform coatings, indicating incompatibility of the polysiloxane with the coating composition.

What is claimed is:

1. A radiation curable coating composition, convertible to a hard, flexible coating having inherent surface lubricity, comprising:

(A) from 5 to 70 weight percent of an acrylate-capped polyether urethane of the formula $$CH_2=CCOOR(OOCNHYNHCOO-$$
$$\underset{Z}{|}$$
$$-X)_{\overline{n}}OOCNHYNHCOOROOCC=CH_2$$
$$\underset{Z}{|}$$

wherein Z is hydrogen or methyl; R is $C_mH_{2m}$; X is the residue of a polyether glycol having an average molecular weight from 300 to 4,000 after its reaction with an organic diisocyanate; Y is the residue of an organic diisocyanate after its reaction with a polyether glycol and a hydroxyalkyl acrylate; $m$ has a value from 1 to 5; and $n$ has a value from 1 to 5;

(B) from 80 to 5 weight percent of a low molecular weight polyfunctional acrylate having an average molecular weight of from 170 to 1,200 and defined by the formula $$CH_2=\underset{D}{\overset{\overset{O}{\|}}{CC}}-R^2-\left[\underset{D}{\overset{\overset{O}{\|}}{CC}}=CH_2\right]_x$$

wherein D is hydrogen or methyl, x is 1 or 2, $R^2$ is chosen from the group consisting of $$-O-CH_2-\underset{\underset{C_pH_{2p+1}}{|}}{\overset{\overset{CH_2Q}{|}}{CCH_2}}-G-\ ;$$

$$-O(CH_2CHO)_{\overline{q}}\ ;$$
$$\underset{M}{|}$$

$$-OC_rH_{2r}O-\ ;\text{ and}$$
$$-OC_rH_{2r}OOCHN-R'-NHCOOC_rH_{2r}O-$$

wherein Q is hydrogen or —O—, G is —O— or $$-OOC\underset{\underset{CH_3}{|}}{\overset{\overset{CH_3}{|}}{C}}CHO-,$$

M is hydrogen or alkyl having 1 to 2 carbon atoms, $p$ has a value of 1 to 3, $q$ has a value of 2 to 6, $r$ has a value of 2 to 15, $r'$ has a value of 2 to 4 and R' is the residue of an organic diisocyanate after its reaction with a hydroxyalkyl acrylate;

(C) from 0.1 to 2.0 weight percent of a polyether-functional polysiloxane chosen from the group of compounds represented by the formulas:

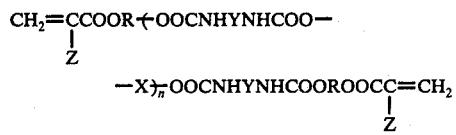

and $MeSi[(OSiMe_2)_tM']_3$ wherein $R^3$ is alkylene having from 1 to 4 carbon atoms; $R^4$ is alkyl having from 1 to 4 carbon atoms; at least 50% of the M' units have the structure

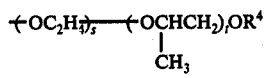

and the remaining M' units are lower alkoxy; Me is methyl; $f$ has a value from 10 to 100; $g$ has a value from 1 to 20; and $s$ to $t$ are numbers such that the molecular weight of the polyoxyalkylene units is from 1,200 to 3,000 and from 20 to 80 weight percent of the oxyalkylene units are oxyethylene;

(D) from 0.5 to 80 weight percent of a monofunctional acrylate having a molecular weight of from 100 to 400; and (E) from 0 to 15 weight percent of a photoinitiator.

2. A radiation curable coating composition as claimed in claim 1, wherein said residue X is the residue of polyoxypropylene glycol having a molecular weight of from 1,000 to 2,500.

3. A radiation curable coating composition as claimed in claim 1, wherein $n$ has a value from 1 to 3.

4. A radiation curable coating composition as claimed in claim 1, wherein (A) is present at a concentration of from 25 to 60 weight percent.

5. A radiation curable coating composition as claimed in claim 1, wherein (B) is present at a concentration of from 40 to 10 weight percent.

6. A radiation curable coating composition as claimed in claim 1, wherein (C) is present at a concentration of from 5 to 60 weight percent.

7. A radiation curable coating composition as claimed in claim 1, wherein (B) has a molecular weight of from 210 to 550.

8. A radiation curable coating composition as claimed in claim 1, wherein (E) is present at a concentration of from 0 to 5 weight percent.

* * * * *